(12) United States Patent
Halpern

(10) Patent No.: US 7,694,003 B2
(45) Date of Patent: Apr. 6, 2010

(54) SYSTEMS AND METHODS FOR MIGRATABLE SERVICES

(75) Inventor: Eric M. Halpern, San Franciscso, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

(21) Appl. No.: 11/749,669

(22) Filed: May 16, 2007

(65) Prior Publication Data

US 2007/0226323 A1 Sep. 27, 2007

Related U.S. Application Data

(63) Continuation of application No. 10/366,075, filed on Feb. 13, 2003, now Pat. No. 7,403,996.

(60) Provisional application No. 60/358,418, filed on Feb. 21, 2002, provisional application No. 60/358,662, filed on Feb. 21, 2002.

(51) Int. Cl.
*G06F 15/16* (2006.01)

(52) U.S. Cl. ............... 709/228; 709/219; 709/224; 370/201; 711/150

(58) Field of Classification Search ........... 709/224, 709/218, 223, 227; 370/201, 219
See application file for complete search history.

(56) References Cited

U.S. PATENT DOCUMENTS

| | | | |
|---|---|---|---|
| 5,644,629 A * | 7/1997 | Chow | 379/142.07 |
| 5,742,668 A * | 4/1998 | Pepe et al. | 455/415 |
| 5,748,882 A | 5/1998 | Huang | |
| 6,163,801 A | 12/2000 | O'Donnell | |
| 6,173,293 B1 | 1/2001 | Thekkath | |
| 6,185,601 B1 | 2/2001 | Wolff | |
| 6,363,411 B1 * | 3/2002 | Dugan et al. | 709/202 |
| 6,393,481 B1 * | 5/2002 | Deo et al. | 709/224 |
| 6,526,521 B1 | 2/2003 | Lim | |
| 6,578,160 B1 | 6/2003 | MacHardy | |
| 6,609,213 B1 | 8/2003 | Nguyen | |
| 6,766,361 B1 | 7/2004 | Venigalla | |
| 6,957,254 B1 | 10/2005 | Iterum | |
| 6,976,079 B1 | 12/2005 | Ferguson | |
| 7,000,019 B2 | 2/2006 | Low | |
| 7,065,616 B2 | 6/2006 | Gaijar | |
| 7,085,834 B2 | 8/2006 | Delany | |
| 7,107,543 B2 | 9/2006 | Berry | |
| 7,127,713 B2 | 10/2006 | Davis | |
| 7,254,634 B1 | 8/2007 | Davis | |
| 7,392,317 B2 | 6/2008 | Halpern | |
| 2001/0049717 A1 | 12/2001 | Freeman | |
| 2002/0004850 A1 | 1/2002 | Sudarshan | |

(Continued)

*Primary Examiner*—Khanh Dinh
(74) *Attorney, Agent, or Firm*—Fliesler Meyer LLP

(57) ABSTRACT

A migration framework provides for the migration of services in a cluster. A migratable target contains a list of servers in the cluster capable of hosting a migratable service. A migration manager can migrate the service between servers in the migratable target, and can activate an instance of the service on the selected host server. The migration manager ensures that only one active instance of the service exists in the cluster. A service stub can serve a user request on servers in the migration target, such as by order of preference, until the user request is served on the server hosting the active instance. A lease manager can assign a lease period to determine how long a server hosts an active instance.

15 Claims, 3 Drawing Sheets

U.S. PATENT DOCUMENTS

| | | |
|---|---|---|
| 2002/0073188 A1* | 6/2002 | Rawson, III ................ 709/223 |
| 2002/0091832 A1 | 7/2002 | Low |
| 2002/0111922 A1 | 8/2002 | Young |
| 2003/0014480 A1 | 1/2003 | Pullara |
| 2003/0041135 A1 | 2/2003 | Keyes |
| 2003/0115366 A1 | 6/2003 | Robinson |

* cited by examiner

US 7,694,003 B2

SYSTEMS AND METHODS FOR MIGRATABLE SERVICES

CLAIM OF PRIORITY

This application is a continuation of pending U.S. patent application Ser. No. 10/366,075, entitled "SYSTEMS AND METHODS FOR MIGRATABLE SERVICES," filed Feb. 13, 2003, now U.S. Pat. No. 7,403,996, issued Jul. 22, 2008, which claims priority to U.S. Provisional Patent Application Ser. No. 60/358,418, filed Feb. 21, 2002, entitled "SYSTEM AND METHOD FOR MIGRATABLE SERVICES," as well as Application Ser. No. 60/358,662, filed Feb. 21, 2002, entitled "SYSTEM AND METHOD FOR AUTOMATED SERVICE MIGRATION," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Application Ser. No. 60/317,718 entitled "Exactly Once Cache Framework," by Dean Jacobs et al., filed Sep. 6, 2001.

U.S. Provisional Application Ser. No. 60/317,566 entitled "Exactly Once JMS Communication," by Dean Jacobs et al., filed Sep. 6, 2001.

U.S. patent application Ser. No. 10/000,708 entitled "Method and Apparatus for Session Replication and Failover," by Eric Halpern et al., filed Oct. 31, 2001.

U.S. patent application Ser. No. 10/000,709 entitled "Hardware Load-Balancing Apparatus for Session Replication," by Eric Halpern et al., filed Oct. 31, 2001.

FIELD OF THE INVENTION

The present invention relates to the movement of an object or service in a cluster.

BACKGROUND

Certain services are designed with the assumption that there will be only one active instance of each service running in a cluster at any given time. Examples of such services include transaction managers, JMS backends, and administration services. In order to enable these services to survive server failures or other problems, a mechanism can be used to move each service from a failed server to a healthy server in the cluster. A problem arises, however, in ensuring that each and every service is never active on more than one server at a time. Another problem, which is common with many distributed systems, involves how to ensure that all servers in the cluster agree to the new server.

BRIEF SUMMARY

Systems and methods in accordance with one embodiment of the present invention provide a mechanism for migrating services between servers in a cluster while ensuring that each service exists only once in the cluster, and exists on a server that is agreed upon by the cluster.

A framework for manually migrating a service between servers utilizes a migration target that contains a list of servers in the cluster that are capable of hosting a migratable service. A migration manager can be used to migrate the service between the servers in the migration target, and can activate an instance of the migratable service on the host server. The migration manager can ensure that only one active instance of the service exists in the cluster at any time. A service stub can be used to serve a user request on the servers contained in the migration target. The service stub can serve the user request on servers in the migration target, such as by order of preference, until the user request is served on the server hosting the active instance of the migratable service. A lease manager can assign a lease period to the server hosting the active instance of the migratable service. The lease period can determine how long the server will host the active instance.

Such a framework can include an administration console that can allow an administrator to initiate and monitor migration among the servers in the cluster. The framework can allow an administrator to activate and deactivate an instance of a migratable service, as well as allowing the administrator to force a migration.

Other features, aspects, and objects of the invention can be obtained from a review of the specification, the figures, and the claims.

DETAILED DESCRIPTION

Systems and methods in accordance with embodiments of the present invention can utilize a migratable service framework to provide the machinery necessary to allow services to be programmed and moved within a cluster. Such a framework can allow a system administrator to manually move such a service. For example, if a server failure occurs, or a server "dies," any migratable services on that server can be migrated to another server in the cluster as directed by the administrator. An administrator might also want to move services off a server if that server needs to undergo maintenance. A migratable service framework can provide a solution that can be utilized by services that manage a shared state, but require high availability, such as transaction logs or the Java Message Service (JMS).

Figure 1:
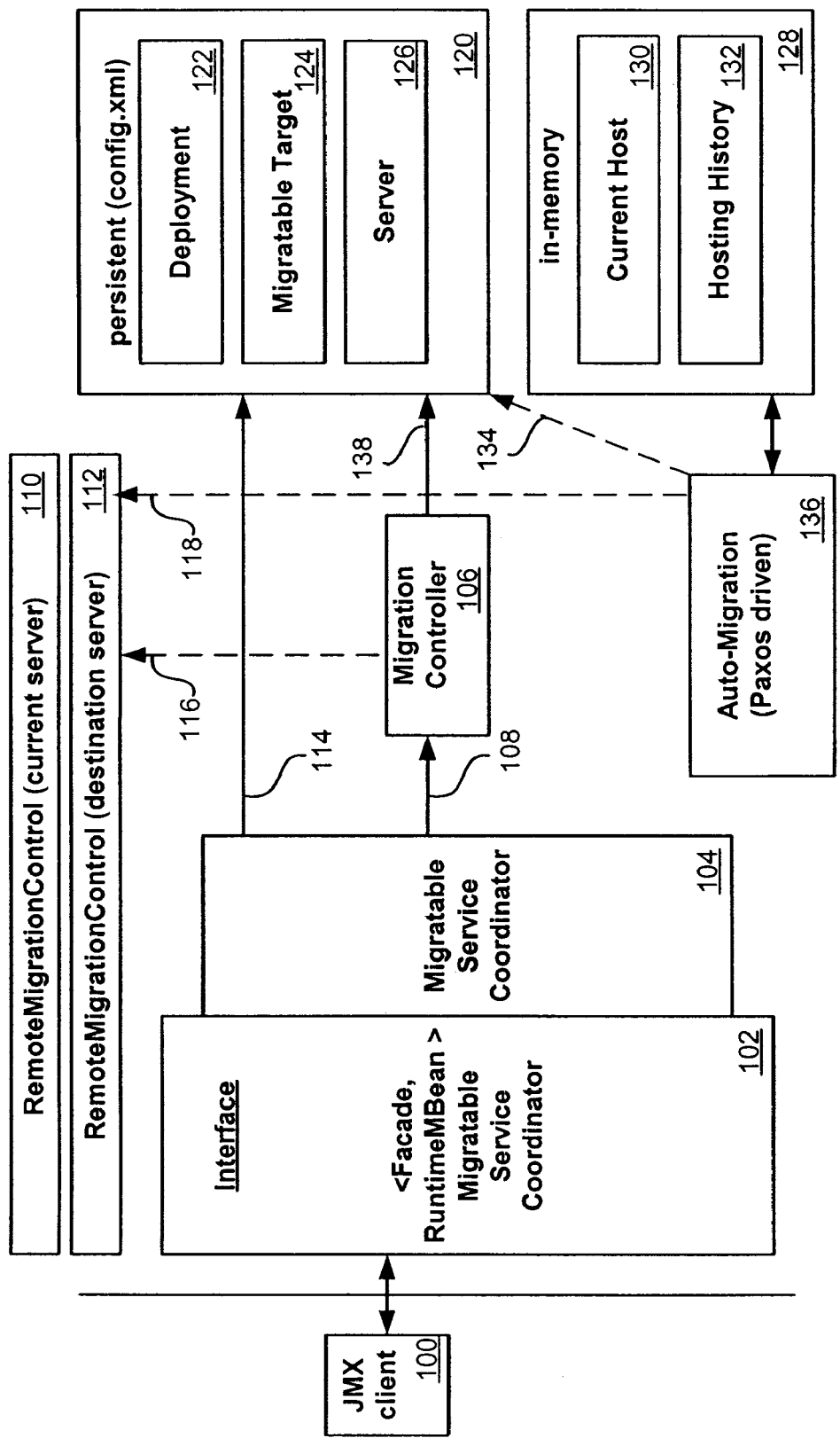
FIG. 1 is a diagram of a framework in accordance with one embodiment of the present invention.

FIG. 1 illustrates an abstract view of the major components involved in managing a migratable service in accordance with one embodiment of the present invention. The system can utilize operations 108, 114, 118, 134, 138 that can affect the system state and can affect the location of the migratable service. Solid lines in the figure denote operations that can controlled by a client such as a Java management extensions (JMX) client, while dashed lines denote internal operations that are not directly invoked from an external client.

This system utilizes a JMX client application 100, or console. The client can manage a migratable service by way of a well-defined management interface 102. Two relevant state components, persistent state 120 and in-memory state 128, are shown. At the top is the actual subsystem implementation of a migratable service, such as a JMS server, that can make use of the migratable service infrastructure. The migration controller 106 is a central entity that represents the logic behind the process of disabling a migratable service and enabling it on a new server. The auto migration block 136 can represent logic that enables an automatic determination of new migration targets if the current migratable service host fails.

This system takes advantage of several implementation units 104, 106, 110, 112, 136. A migratable service coordinator unit 104 can be used by the interface to work with the migration controller 106, or migration manager, to affect and manage migration. This can involve remote migration controls, for both the current host server 110 and the destination or new host server 112. If the migration is automatic, an auto-migration unit 136 can be used in affecting migration, such as by utilizing Paxos to select and agree on a new host server. A Paxos or other algorithm utilized in auto-migration can take advantage of information in the in-memory state 128, such as the identity of the current host 130 and the hosting history 132, or identities of previous hosts. The migration controller 106, or migration manager, can utilize persistent state information 120, such as may be contained in a config.xml file, to affect migration. This information can contain deployment information 122, the migratable target list 124, and server information 126.

Figure 2:
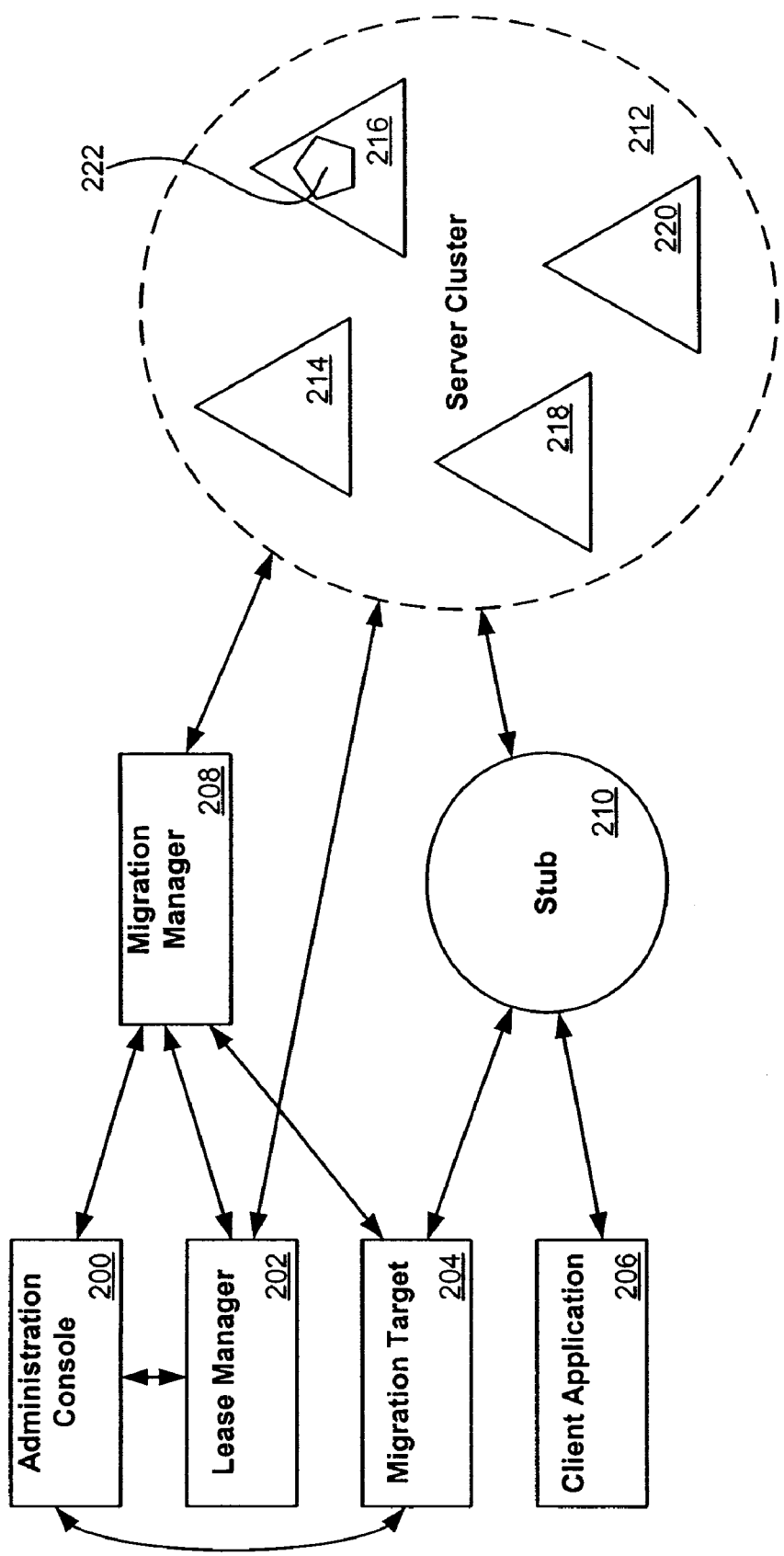
FIG. 2 is a diagram showing an over view of a system that can utilize the framework of FIG. 1.

FIG. 2 shows a simple overview of a system that utilizes service migration. In the figure, a server cluster 212 contains servers 214, 216, 218, 220 that can be capable of hosting an active instance of a migratable service 222. A client or client application 206 can serve a request on a stub 210, which can direct the request to the server 216 hosting the active instance 222. If the stub is not able to serve the request on the server hosting the active instance, such as if that server 216 is not communicating or if the migratable service has been migrated, the stub can check the migration target 204 to find the next likely server in the cluster 212 to be hosting the migratable service, and can contact that server.

An administration console 200 can be used to monitor and affect migration. The administration console can force a migration by sending a request to a migration manager 208. The migration manager 208 can otherwise manage migration itself, such as by checking the migration target 204 to determine host preference and checking a lease manager 202 to determine the remaining period on an instance lease. The migration manager 208 can use this information to move the active instance 222 to another server 214, 218, 220 in the cluster 212. The lease manager 202 can contact the server 216 hosting the active instance 222 directly, such as to renew the lease period for that instance. The administration console 200 can serve requests on the lease manager 202, such as to change the leasing period or force the end of a lease period.

A JMX API can be used to enable certain migration operations. One such operation involves manual migration in both automatic mode and manual migration mode. Another such operation involves forced activation in manual migration mode. The manual migration operation can be used to proactively move a service, such as while the new and old server are still running. A forced operation can be used to force the activation of a service on a new server, such as after an administrator determines and ensures that the old server cannot be restarted.

If automatic migration is enabled, a system can autonomously trigger and execute a "service migration" in case a server fails, such that there is no need for the administrator to use the forced activation operations. There can be an autonomous migration in automatic migration mode.

A migration solution in accordance with one embodiment of the present invention can be composed of many parts. A service provider interface (SPI) for a migratable service can be defined that specifies the contract that a migratable service provider should implement. A special migration-aware service stub can be defined that is able to find the current host of the service, transparent to the caller. A service stub is, generally speaking, a stand-in implementation of a service that can run locally, fast, and in-memory. A migratable target MBean can be defined that describes a new type of deployment target for migratable services.

This migratable services framework can hide the migration implementation from a service provider. Overarching forms of migration that can be provided include both manually-controlled migration and automatically-controlled migration. Once a provider has hooked into this framework, either of these modes can be utilized. In manually-controlled migration, an administrator can drive the migration process. This can be done either in response to a server failure or under more controlled circumstances, such as for maintenance reasons. In automatically controlled migration, the cluster can drive the migration process by automatically migrating any migratable service whose current host has failed to another healthy server. Both implementations can guarantee that one instance of a service is active at any given time, even in the case where failures occur during the migration process.

To date, many servers do not provide a mechanism to allow services that must be pinned to a single server to take advantage of the redundancy of a cluster. There may be no convenient way to recover from a failure of a server that hosts any of these pinned services. Important such services can include transaction services, JMS message services, and administration services. A migratable service framework can provide the key primitives to make such services highly available. Such a framework can be designed for internal use only if so desired. The framework can be invisible to users, but can enable customer-visible availability in certain systems.

Such a framework can provide the underpinnings of high-availability for several services that may rely on a single server to run. These services can include, for example, Java Message Service (JMS) back-ends, Java Transaction API (JTA) recovery, and administration services. Other such services can include Java connector architecture (JCA) connectors, timers, partitioned caches, and other services. Such a framework can provide support for features that can be visible to a user, such as manual fail-over migration, maintenance migration, and automatic fail-over migration. For instance, all migratable services hosted by a server that fails can be migrated to another functioning server through the administration console using manual fail-over migration. An administrator can move migratable services from one functioning server on the fly using maintenance migration. All migratable services hosted by a failed server can also be migrated to other functioning servers automatically using automatic fail-over migration.

In some embodiments, it is only possible to migrate such a service from one server in a cluster to another server in the same cluster. Other embodiments or implementations can offer more flexibility.

A system can provide the ability to notify a service instance when it is activated, as well as providing a way to register or de-register a migratable instance. This can require two phases in order to ensure that a failure to activate does not result in an inconsistent state. It can also be necessary to provide a way to notify a service instance when it is deactivated, such as when a service is being migrated under controlled conditions. Since the time to complete a smooth deactivation can be relatively long, such as in the case of JMS, a system can allow an administrator to force deactivation.

A system can provide a way for the current instance of a migratable service to signal that is has completed its work. In such a case, there is no need to migrate the service if the current host fails, as there is no pending work to be completed. This can fulfill a JTA requirement to support the fail-back of a log to the server that created the log. In one approach, a log can be migrated to another server for recovery when a server fails. When recovery completes, the recovery manager on the second server can signal completion. When the original server is restarted, the original server can reclaim the log without requiring any migration.

A migratable service can appear as an remote method invocation (RMI) object to the appropriate clients. The service can be represented remotely, such as by a migration-aware stub. In most cases, this stub can mask migration events from the caller. Whenever a client calls the stub, the stub can route the call to the active service instance. If a migration occurs between calls, the stub can transparently route the next call to the new active server.

Each call can be migrated to the current migratable service instance when possible. If a migration has occurred after an initial call, but before a subsequent call, the subsequent call can be routed to the newly activated instance. If migration is in progress at the time of a call, the call can be blocked until migration has occurred. This option can make migration fully transparent to the caller, but can also block a thread. This option can be used in conjunction with a migration Timeout property to timeout the retry if the request timeout expires before it succeeds. This option can be most useful on a client, since the option can consume a thread for the duration of the migration.

A system can also return control to the caller by throwing an exception, such as WaitForMigrationException. Such an option can be useful, as migration can take a significant amount of time, or may not occur at all in the manual case. This option can also allow a caller to reclaim control of the thread and choose when to retry the call. This exception can include a field that provides a hint about how long a user should wait before retrying the request.

A system can also provide a way for a client to be notified when migration is complete, such as from within the cluster hosting the service. This can be used in conjunction with the previous feature to avoid polling for migration completion.

A migration-aware stub can also work correctly with a one-way method, so as to support a service such as JMS. For such a one-way method, the stub can provide transparent fail-over. If, at the time of the call, it is not possible to create a socket to the server hosting the current instance, the stub can transparently fail-over to a new instance. In all other cases, the stub can lose control before the success of the call can be determined. Clients that depend on one-way calls may need to employ another mechanism in order to detect failures and initiate fail-over in such a situation. The client can determine the current host and register a listener, such as PeerGoneListener, on that host. Whenever the connection to the host is lost, the client may need to reissue any call that is not known to have reached the migratable service. If it is necessary to pass a migration-aware stub to a client that does not support migratable services, the stub can be converted to a standard pinned stub.

A migratable target can be used, such as a special target that can migrate from one server in a cluster to another. In order to configure a migratable service for migration, the migratable service can be deployed to a migratable target. A migratable target can specify a set of servers that are able to host a target. The migratable target can optionally specify a preferred host and an ordered list of preferred backup servers. Only one of these servers can host the target at any one time. A migratable target can be configured to migrate automatically, or to require manual intervention when the current host fails. A migratable target also can provide a way to group migratable services that should move together. When a migratable target is migrated, all services deployed to that target can be migrated as well.

A migratable target can be migrated manually by an administrator. When such a target is manually migrated, all services deployed for that target can be manually migrated, or can migrate automatically with the target. This can be done, for example, in response to a server failure or for controlled maintenance. A migratable target can also be migrated automatically in response to server failure.

Manual migration can be both safe and predictable. Manual migration can be safe, as it can allow a human administrator to determine whether a server is truly dead. Such a determination cannot always be made definitively by automatic machinery. Manual migration can be predictable because the migration can be configured to occur only upon command of an administrator. Manual migration can also allow the administrator to decide where services reside.

A system can allow a migratable target to be migrated from a failed source server to a healthy destination server. In this case, an administrator can be required to verify that the source server has failed.

A system can also allow a target to be migrated to a server that is "stopped," or not currently serving requests. In this case, the stopped server can activate services associated with the target when it is started. This feature is presently required by JTA to allow the original owner of a transaction log to reclaim the log before it starts. In some systems, migration can occur to a suspended server.

A system in accordance with one embodiment of the present invention can also allow for many other migration situations. Such a system can allow a target to be migrated from one healthy server to another without waiting for in-flight work to complete on the source. A system can also allow a target to be migrated from one healthy server to another, ensuring that no pending work is lost. This can require that all migratable services on the destination be allowed to complete in-flight work before being deactivated. If the source server fails during controlled migration, it can still be possible to complete migration. Here, the administrator can be required to verify that the server has failed. If the destination server fails during migration, the system can remain in a consistent state and can retry migration to another destination. It may be possible to hard-migrate a simple target from one server to another in less than a minute. A graceful migration can take longer, but can be overridden with a hard migration if necessary.

While failure may be rare, it can be important to ensure that migration occurs in a timely manner when failure occurs, as such a delay can result in a loss of service. On the other hand, it can be even more important to ensure that migration is correct and that there are never two active instances of a server.

The time required for migration can depend on several factors, many of which may be out of the control of a migration framework. These factors can include the time to detect and signal server failure, the time for an administrator to respond in manual migration mode, the time for the cluster to respond in automatic migration mode, and the time to activate a service instance.

Administration Console

A system in accordance with one embodiment of the present invention can provide a tool, such as an administration console, that allows an administrator to monitor and affect a migration. Such a tool can provide a way to assign a migratable service to a migratable target in the console. An administration console can also provide a way to migrate a target under many different conditions. A controlled migration can take some time to complete, and it can be beneficial to provide a way for an administrator to monitor progress and force a migration if necessary. In order for an administrator to take action, the administrator can require notification that a server has failed. An administration console can provide a way to easily monitor the health of servers.

When doing manual fail-over migration, an administrator may need to verify that a server that is not responding has truly failed and that the failed server will not spontaneously restart. An administration console can be configured to guide the administrator through this procedure.

Whenever an administrator starts a server, an attribute such as ExpectedToRun can be set to 'true' on the appropriate ServerMBean for that server. Whenever the administrator stops a server, the ExpectedToRun attribute can be set to 'false'. This can provide a record of administrative intent. It may say nothing about whether a server is running, but can indicate that the server is intended to be running. If a failure occurs, it can be assumed that the failed server will not be restarted. This record of intent can be used by a nodemanager, for example, to determine whether a server is a candidate for restart. This record can also be used by a cluster to ensure that only servers intended to be running are allowed into the cluster, or to determine the minimum quorum size for the cluster, which can be crucial for automatic migration. If a server fails that is expected to run, an administrator has at least a few different options. For instance, the administrator can restart the server, wait for the server to restart automatically, or pull the server out by stopping it and setting the ExpectedToRun to 'false'.

A constrained procedure can be used for changing the membership in a cluster, such as by adding or removing servers. When adding a server, it may be necessary to verify that the server is not yet running, set the cluster attribute for that server, and start the server. This process can implicitly set ExpectedToRun to 'true'. This process can further involve a two-phase operation when auto-migration is enabled to ensure that all servers are alerted of any changes to the quorum size. When removing a server, an administrator can stop the server, which can cause ExpectedToRun to set to 'false' and can clear the cluster attribute.

Irrespective of which mode a migratable target is in, certain preconditions can hold for the manual migration and forced activation operations. An administrator can use a forced activation to activate a service on a new server, such as if the current host has failed and cannot be restarted. A manual migration operation can be used pro-actively to move a service, such as when the new host and old host are still running. The migratable target's cluster can contain at least one server, since there would otherwise be no server that could host the service. The new destination server should be different from the current host server, which can be the preferred server in manual migration mode. The current host can be found in one embodiment by querying a runtime MBean. The new destination server in this embodiment will be a member of the migration target's clusters. If an explicit candidate server list is specified, the new server will be selected from the candidate server list. In automatic migration mode, there may need to be at least three servers configured to be active in the cluster associated with the migratable target in order to form a quorum for agreement.

A stub can be pulled that has the identities of the current host server and other potential host servers in the cluster. If the stub fails to serve a request on the current host, the stub can retry the request on one of the potential hosts. If the stub contacts a potential host with which the stub can communicate, and that host is not the current host, the potential host will return a notification to the stub that will refer the stub to the correct host. The stub can then try to serve the request on the "correct" host. If the "correct" host is not actually the current host, the "correct" host will serve a notification on the stub and the process will continue until the stub is able to serve the request.

Migration Modes

In manual migration mode, manual migration can ensure connectivity with the current host server and the new destination server. Manual migration can delegate a deactivation request to a remote migration controller of the currently host server. This controller can in turn deactivate all migratable services that are deployed to the migratable target. The administrator can ensure that the old host is down and that the old host will not come back up. Manual migration can set the new destination host to be the preferred server, and can persist the attributes of the migratable target to a configuration file.

In automatic migration mode, proactive manual migration can be performed as in manual mode. One exception is an EOS/paxos or similar system, which can ensure that a majority of cluster members agree to the move. An Ess Operating System (EOS) is a major operations support system, which can utilize a paxos or similar algorithm for distributed consensus. This safeguard can be used in cases of cluster partitioning, for example.

Instead of a forced activation from an administrator controller, an EOS/paxos subsystem can take on the role of the administrator and autonomously activate the service on a new host when a host server fails in automatic migration mode. The EOS/paxos subsystem can wait for all leases to the old service host to expire. An upper bound can be, for example, the least period that EOS uses, such as five seconds. A new host can be chosen in accordance with the preferences expressed in each migratable target that is affected, such as if the explicit candidate server set is used. This step can use a paxos or similar distributed consensus algorithm to choose a single server that can make the placement decision. In some embodiments, all servers in the cluster must agree on the server decision.

If an administration server is reachable from the server that makes the placement decision, the new server can be stored as the preferred server in a configuration file for the migratable target, such as in a config.xml file. If the administration server is down, the active server can be kept in a paxos ledger on each server. The preferred server in a configuration file can be updated when one switches to manual migration mode.

When switching from automatic to manual mode, the active server can be set as the preferred server, such that if the server restarts in manual mode it will activate the service and keep the service available. When switching from manual to automatic mode, there may be no immediate effect until the next automatic or manual migration request. For the operation to be allowed, however, all candidate servers of the migratable target may need to belong to the same target. In manual mode, the servers do not have to belong to a cluster. Also, at least three servers in a cluster can be configured to be active. Otherwise, an automatic migration mode might not be able to determine a quorum. A mode change may need to be agreed upon by all cluster members so that they will act consistently should they be asked to participate in a leader election.

External Operations

External operations can be specified in terms of their effect on the relevant system state, as well as their effect on any internal operation. A deployment operation may not be visible externally, but may be triggered by external operations such as the addition of a non-empty migratable target to a migratable service target list. The deployment of a migratable service to a migratable target can encompass deploying a migratable service to all servers in the cluster associated with the migratable target. Even if an explicit candidate server set is given, such that the service should be activated on a subset of all cluster members, the service can still be deployed to the entire cluster. This can simplify the handling of potential changes to the explicit candidate server list.

After successful cluster-wide deployment, the preferred server can be activated. In manual migration mode, this can be performed by the preferred server itself. The server can realize that it is "preferred" and can activate the migratable target, thus activating the services deployed to that server. In automatic migration mode, an EOS/paxos subsystem can attempt to activate the preferred server, and can try another candidate server if the preferred server activation fails.

A service activation or deactivation operation may not be externally visible, but can be triggered by external operations, such as a manual migration in automatic and manual migration mode, a forced activation in manual migration mode, and an autonomous migration in automatic migration mode. The migratable target can include a mode-flag that specifies whether or not automatic migration is allowed.

If only manual migration is allowed, a preferred server can be selected as an activation candidate. If the deployment of the migratable service for the preferred server fails, the user can be informed, such as through a console or bootstrap command line tool, and no attempt to deploy to another member of the candidate list may be made.

If automatic migration is allowed, a system such as an EOS/paxos subsystem can start with the preferred server and attempt to find a majority of "restartable" cluster members that agree on the fact that the services deployed to the migratable target should be activated on the preferred server. If this activation attempt fails, further candidates can be chosen from the explicit candidate server list or from the cluster, and the agreement process can be repeated. If none of the servers activate the migratable service successfully, the user can be informed through a console or command line tool, and no attempt to deploy to another member of the candidate list can be made.

If the migratable service hosting server fails in manual migration mode, a system may not perform any autonomous activity in response to the failure of the host server. If the system is in automatic migration mode, an autonomous migration attempt can be made. If the number of running servers at the time of the failure is three, the system can elect a new leader from among the two remaining servers, as they still form a quorum. If another server fails, leaving only one server running, the migratable services can be stopped since the remaining server does not form a quorum.

If there is only one remaining server, the system can alert the user and ask for permission to migrate all services from the failed second server onto the remaining server. The automatic migration machinery may need to be "tricked," such as by assigning the one remaining server enough weight so that a "majority determination" algorithm would conclude that the single server still forms a majority or quorum and thus can host all services.

Another option involves alerting the user that migratable services will be unavailable and that the operator should perform steps to recover the services on the single remaining service. These steps can include switching the migratable target to manual mode and manually migrating the migratable target to the single remaining server. Also, the cluster and migratable target can be reconfigured to include only the single remaining active sever. Optionally, the automatic migration mode can be turned on.

A node manager can be used to maintain the list of servers that should be restarted. A system can require this information in order to determine whether a quorum of servers in a cluster agree on a decision. A quorum can be set as a majority of servers in a cluster that are configured to be restartable, or at least a certain number of servers.

If automatic migration is enabled for at least one migratable target that is associated with a cluster, changes to a restart attribute of any server in that cluster may need to be voted on by the system so that the system can potentially 'veto' the status change and record the information in the ledgers of the cluster members.

If servers that are disconnected from the administration server are allowed to be started from their cached configuration, situations can arise where a node manager for the managed server will restart the managed server, even though the administration configuration was changed in the meantime to not restart that server. This can be a major issue for a system such as an EOS/paxos subsystem, since the quorum that paxos must achieve is smaller. The server can still believe it should restart and thus can contribute to voting rounds.

A migratable service can be targeted to at most a single migratable target in some embodiments. Methods such as setTarget( ) and addTarget( ) can be used to enforce the fact that there is at most one migratable target per migratable service. No other target type may be allowed.

Adding a migratable target to a migratable service target list can trigger the deployment of the migratable service. If the migratable service deployment fails, the migratable service target list can be in its original state, such as an empty state. An exception can be raised to the caller, which can include a brief description of the reason why the deployment failed.

Removing the migratable target from the migratable service target list can trigger the undeployment of the migratable service. If the migratable service undeployment fails, the migratable service target list can be in its original state, which can include the migratable target. An exception can be raised to the caller, which can include a brief description of the reason why the deployment failed.

Pages of a console can allow for the selection of deployment targets, as well as the selection of a set of servers or clusters. For a migratable service, however, only a single migratable target can be chosen for certain embodiments. In contrast to regular application and module deployments, where the target service list for a module can specify where the modules are to be deployed, the definition of the migratable target for migratable services can specify the candidates and the order of preference for the servers which can host the migratable service. This can facilitate the user in easily moving a set of migratable services from one server to another manually, as well as allowing for a set of migratable services to share the set of candidate servers and their order of preference.

The user interface will not display empty migratable targets as candidate targets for migratable services in some embodiments. If at least one server is added to a previously empty migratable target, the target selection page for the migratable service can display that migratable service as a candidate. The target selection page can refresh the list of migratable targets, since the definitions may have changed.

An administration server can be thought of as an administration service, and can be moved as a migratable service. A migration controller instance can stay alive on the "old" administration server so that it can complete the handoff. The persistent data of the administration server can include a config.xml file and all files to which it refers. A simple interface can be provided which allows users to place these files in a jar as well as to move the files. A migration tool can first lookup the configuration of the destination server, such as the address port, so it can perform a Java naming and directory interface (JNDI) lookup of the remote migration controller before it can get to an MBean. This migration tool can update the migratable target MBean after successfully completing the migration, so the migration tool can lookup the MBean on the destination MBean server in order to change the MBean.

System States

In one embodiment, a relevant system has seven persistent and two in-memory components. In a persistent state, a system can utilize a MigratableTargetMBean component. A MigratableTargetMBean component is a named entity that can specify on which server a set of migratable services is to be deployed. Multiple services, such as JTA, JMS, and administration services, can be targeted to the same instance of a migratable target so that they share the actual placement and migration decisions. MigratableTargetMBean can be a subclass of TargetMBean.

Another component for a persistent state is an AutomaticMigrationEnabled variable for MigratableTargetMBean. AutomaticMigrationEnabled is a boolean that can dictate the behavior of the system in case the server hosting a migratable service fails. If AutomaticMigrationEnabled is true, the migratable target is said to be in "auto migration" mode. The system can automatically attempt to find a new host and migrate all migratable services that share the migratable target to that new server. If false, the migratable target is said to be in manual migration mode. The system will not attempt to migrate the set of affected migratable services automatically. Changing from true to false can imply that the current host server must be made the preferred server.

A cluster component can be used with a persistent state. Each migratable target can be associated with the cluster in which the target allows services to be migrated. If there are no explicit candidate servers, the preferred server of the migratable target can be any server in the cluster, such as if every member of the cluster can access the shared store. If an explicit set of candidate servers is set, it can restrict the placement so that the preferred server of the migratable target must be within the candidate server set. In this case, all candidate servers must be part of the cluster associated with the migratable target.

A Targets component of MigratableTargetMBean can be used in a persistent state. A Targets component can denote an explicit list of candidate servers that all migratable servers, deployed to the migratable target, shall be hosted on. Targets can be used to limit the placement freedom to the set of servers, rather than to any server in the cluster. This can support, for example, dual-ported disk configurations where only two members of a cluster can access the disk. All candidate servers can belong to the same cluster. Servers that are not in the cluster associated with the migratable target may not be part of the candidate list. In manual migration mode, the order of the list can be relevant as the first element can be the preferred and active server, or the server that will activate a service when booted. In automatic migration mode, the order can represent the order of preference. The first server in the list may not necessarily be the active server for a EOS/paxos subsystem, which can maintain server activation. Servers in the list can be selected in order if activation of a migratable service in automatic mode fails. Only servers can be elements of the migratable target list if using a JMX API.

A Pref component of MigratableTargetMBean can be used in a persistent state. Pref can denote the server that is preferred to activate the migratable target. The preferred server can be in the cluster that is associated with the migratable target. If an explicit candidate server set is used, the preferred server can be in the preferred server set. In manual migration mode the preferred server can activate the migratable target, or all services deployed to it, when the preferred server boots. The preferred server can be updated after a successful manual migration. In automatic mode, the preferred server can be updated only if the user switches a migratable target from automatic to manual mode. While in automatic mode an EOS/paxos subsystem can have its own notion of the currently active server kept in each server persistent ledger. This can allow for automatic migration even if the administration server is down.

A Targets component can be used with an EOService DeploymentMBean in a persistent state. The Targets attribute of the migratable service can denote the migratable target to which the service shall be deployed. The list can contain at most a single element of type MigratableTarget, and no other target type can be mixed with a MigratableTarget For an in-memory state, a component such as CurrentHost can be used with automatic mode. This component may be relevant only if AutomaticMigrationEnabled is true. CurrentHost can denote the server that currently hosts a particular migratable service. CurrentHost can be null if a migratable service is not currently deployed, either because the service is not targeted or because the deployment failed on all candidates.

A HostingHistory component can also be used with an in-memory state. HostingHistory can include an ordered list of servers that hosted the migratable service at some time in the past. The first element in the ordered list can be the most recent hosting server. Ths history can be cleared after a manual migration operation. The automatic migration operation can be constrained to never go backward in the candidate list if automatic migration is enabled.

Several public operations can affect the system state variables. One such operation is the manual migration of a migratable target to a new destination server. Another such operation includes the addition and removal of a server from the candidate list of a migratable target. Changing between manual migration mode and automatic migration mode can also affect the system state variables, as well as deploying and undeploying a migratable service to a migratable target or changing the number of servers in a cluster.

Internal system operations that can affect system state variables include the automatic migration of a migratable target to a new destination server, as well as the handling of the failure of a server that currently hosts services deployed to a migratable target. There are constraints that can be imposed on certain operations so that invariants relied upon by the systems are maintained. These operations include the deletion of a server and the changing of a cluster to which a server belongs.

Migratable Interface

Each migratable service can implement a migratable interface. A migratable interface can define the methods that a migration framework can use to carry out migration. When a migratable service is deployed, an instance of the service class that implements this interface can be installed on every potential host and registered with a local migration manager. A migratable interface can define the methods used to manage the lifecycle of each instance.

When an instance is first deployed, a migratable framework can call an initialize method, such as mgInitialize( ). When this method returns, the instance can be initialized but inactive. Once an instance of the service has been deployed on each potential host, the framework can choose one instance to activate and can call an activate method such as mgActivate( ) on that instance. When this call returns, that instance of the service is active and all others are inactive. When it is time to migrate an instance, the framework can first call a deactivate method on the active instance. The framework can then call an activate method on the new instance. When the second call returns, migration is complete.

In addition to implementing this interface, a service class can also implement a remote interface that defines the appropriate service methods. This implementation can meet special requirements in order to function properly as a migratable service. The implementation can guarantee that no service method called before the end of a lease will return after the lease has expired. This can be accomplished in a number of ways.

One way to accomplish this is through a framework-managed approach. If a provider can declare a maximum method completion time, the framework can automatically disallow any call when the lease time remaining is less than the maximum completion time. By default, the framework can assume a maximum completion time, such as five seconds for all methods. This time can be changed using a max-completion-time attribute in an RMI descriptor, for example.

Another way is through a service-managed approach. If a service requries more control than is provided through the framework-managed approach, a framework can do its own lease-checking by using a lease monitor that can be passed during initialization. To use a lease monitor, a provider may need to include an "impl-managed-lease" or similar attribute in an RMI descriptor.

An initialize method can be called to initialize an instance of the migratable service. The cluster can call an initialize method then the instance is registered with a local migration manager. When this call completes, the instance can be considered initialized but inactive. The method can accept a leaseMonitor or similar parameter, which can identify an object that this instance can use to monitor the state of its lease.

An activate method can be called to activate an instance of a migratable service. The cluster can ensure that only one instance is active at a time. This instance can respond by preparing to service requests. This can involve recovering the service state from persistent storage.

A deactivate method can be called to deactivate an instance of a migratable service. In order to ensure that there is never more than one active instance, the cluster can call a deactivate method on the currently active instance before calling an activate method on another instance. The instance can release any claimed resources that may be required by the new instance. The cluster can make a best effort to call a deactivate method, but this may not be possible in all cases, such as where the server hosting this instance fails. For this reason, the migratable instance can be prepared for failure at all times. This method can provide an opportunity to expedite the migration by cleanly shutting down.

Migration Manager

A migration manger class can manage the activation and deactivation of migratable instances hosted by a particular server. The class can be responsible for keeping track of all migratable services installed on the server, as well as the migratable targets with which they are associated. Whenever a migratable target is moved, whether manually through JMX or automatically through the cluster, the manager on the source server can ensure that all migratable instances associated with that target are deactivated. The manager on the destination server can ensure that all migratable instances associated with that target are activated A register method for the migration manager class can register a migratable instance on a local server. This method can be called by a migratable provider when an instance is installed on a local server. Each instance can be associated with a migratable target. The migratable manager can ensure that whenever the migratable target is migrated, all associated migratable services will be migrated. This can involve calling a deactivate method on each migratable instance hosted by the source server and calling an activate method on each migratable instance hosted by the destination server. If the target is in manual migration mode, the migration manager can activate the migratable. This can occur if the server hosting this migration manager is the preferred server in the target candidate list.

An unregister method can also be used, which can unregister a previously-registered migratable instance. An unregister method can be called by the migratable provider when the instance is undeployed. If the target is in manual migration mode, the migration manager can deactivate the migratable. This can occur if, for example, the server this migration manager is on is the preferred server in the target candidate list.

Migratable Service

A migratable service is a stateful service that is capable of migrating from one server to another, such as in a cluster. A cluster can ensure that each migratable service is only active on one server at a time. A cluster can also ensure that migration is transparent to any remote clients of a service. A service can be migrated either manually by administrative command or automatically, such as by cluster fail-over machinery.

A typical migratable service can require a single point of control in a cluster, and can be capable of recovering its state from a shared persistent store. If utilizing a write-through cache of persistent data, such a service can maintain a consistent cache of persistent data by writing each update directly to a data store and invalidating any effected cache. Reads on the data can avoid the store if the data is cached. A guarantee that all reads and writes go through a single instance of the service can be relied upon to ensure that a consistent view of the data is maintained. If there are two instances in the cluster, an update through one cache may not be reflected in a read from the other.

A migratable service can provide a class that implements a migratable interface. In addition, such a class can implement an interface describing its service methods. If the service is remotely accessible, this service interface can be a remote interface. An instance of a migratable class can be installed on each server in the cluster that can host a service. One of these instances can be chosen, either manually or by the cluster, to be the active instance. This instance can be activated and all others can remain inactive. When migration occurs, the active instance can be deactivated and a new instance activated. If the migration is due to failure of the active instance, the cluster can ensure that the failed instance is dead, or has timed-out, and can activate the new instance.

It may not always be possible to distinguish a server that is dead from one that is unreachable. If a server is truly dead, a cluster can safely migrate any service hosted by the dead server to a live server. If a server is unreachable, but still alive, migration to a new server can result in two active instances of the service in the cluster. The service can still be active on the unreachable server. The migration framework can address this problem with the use of leases.

When a migratable service is activated, it can be given a lease. This lease can indicate the amount of time that this instance can assume ownership of the service. This lease can be renewed periodically so that a service will remain active if it is not migrated. If the server loses contact with the cluster, any leases that the server holds will not be renewed and will eventually expire. When a lease expires, the associated instance will be deactivated, even if no other server can reach this server. This lease management can be hidden from a migratable service provider, but can place a constraint on the provider implementation. The provider can ensure that each service method will complete within a fixed time. This can be necessary for some frameworks so that a framework can disallow any call to a migratable instance that may complete after its lease expires.

If a migratable service implements a remote interface, the migratable service can be represented by a migration-aware stub on remote clients. This stub can be aware of the multiple instances of the service in the cluster and can ensure that calls are directed to the active instance. If a migration occurs between calls, the stub can detect the move, track down the new instance, and direct the call to the new instance. This recovery can be transparent to the caller. If a call occurs after an instance has been deactivated but before a new instance has been activated, the stub can throw an exception. This exception, such as a WaitForMigrationException, can indicate to the caller that the service is temporarily unavailable. It can also provide a hint about when the migration might complete.

Migratable Targets

A migratable service cannot be deployed to a standard target in certain embodiments. Such a migratable service must instead be deployed to a migratable target. A migratable target is a "virtual" target that can migrate from one server to another. Services that are deployed to such a target can migrate along with the target. A migratable target can specify a list of servers ordered by preference. The first server in the list can be the preferred host. If that server is running, that target can always be hosted by that server. The second server in the list can be the next most preferred server. If the first server is not available, the target can migrate to the second server. A migratable target can be manually or automatically migratable.

A manual migratable target can be migrated from one server to another manually through an administration server. Any migratable service deployed to this target can migrate when the target is migrated. The target can specify a list of servers in order of preference. This can provide a hint to the cluster about where the administrator is likely to migrate a target if a failure occurs. When a service is deployed to this target, it can be activated on the first server in the target list. If that server is not reachable, the service will not be activated until the administrator explicitly moves the target to the next server in the list. Following the list order in manual migration can be helpful, but may not be required. It can make it possible for a stub to more quickly find the new host.

An automatic migratable target can be migrated automatically by a cluster. Any migratable service deployed to this target can be migrated when the target is migrated. The target definition can specify a list of servers in order of preference. When the cluster migrates the target, it can migrate to the first server in the list that is currently available. Automatic migration can occur when the cluster detects that the current host of the target has failed. Note that there is no automatic fail-back in this embodiment. If the most-preferred host becomes available after a target has migrated to a less-preferred host, the system may not automatically migrate the target back to the most preferred host.

Remote Migratable Interface

A remote migratable interface can be implemented by any migratable service class that provides remote access to its service. A remote migratable interface can allow a migratable service to implement remote methods. A cluster runtime can recognize objects that implement this interface and ensure that the remote object is represented by a stub that is capable of routing calls to the current active instance.

Service methods of a remote migratable can be called through a "stub" or "skel" layer of RMI. RMI provides a way for Java objects instantiated by different Java Virtual Machines to exchange data, as well as to use each others' fields and methods. The RMI architecture comprises three independent layers, with each layer defining specific protocols for layer interaction. A stub or skeleton layer can provide a gateway between a server and a client. A stub can be downloaded by the client to provide a connection to a corresponding skeleton on the server. The stub can provide an interface for initiating remote calls, preparing arguments to be passed within the remote call, and interpreting the return values of the method calls. The skeleton (or "skel") can interpret incoming arguments, invoke the object method requested by the client, and prepare the return value to be communicated back to the client. The stub/skel layer can provide the interface between the RMI system and the Java application.

The other layers in the present RMI architecture include the remote reference layer and the transport layer. The remote reference layer can provide an interface to the protocols for invoking methods on remote objects. It can transfer data between the stub/skel layer and the transport layer. The transport layer is the low-level networking protocol used to pass object data between the client and the server.

If the service methods of a remote migratable are called through a stub/skel, the runtime can ensure that no method will be called if that method might not complete before the lease expires for the service instance. This can require that the provider and the runtime agree on the upper time bound, or the time which the longest service method can take. By default, the runtime can assume that a method will never take longer than 5000 milliseconds. This can be overridden by the provider by specifying the time-to-complete attribute in the RMI descriptor.

If a migratable aware stub encounters a transient failure due to migration, the stub can block until it can complete the request on the new server. This behavior can keep the fail-over process transparent to the caller but can block a thread. The provider can alter this behavior by setting an attribute such as no-block-during-migration to 'true' in the RMI descriptor. With this setting, the stub can throw an exception, such as WaitForMigrationException, when a failure indicating a migration in progress occurs. The caller can respond to this exception by proceeding with other work and deferring the retry for later. It can use a method such as WaitForMigrationException.getSuggestedWait( ) to determine when to retry the request.

Server Service Interface

Figure 3:
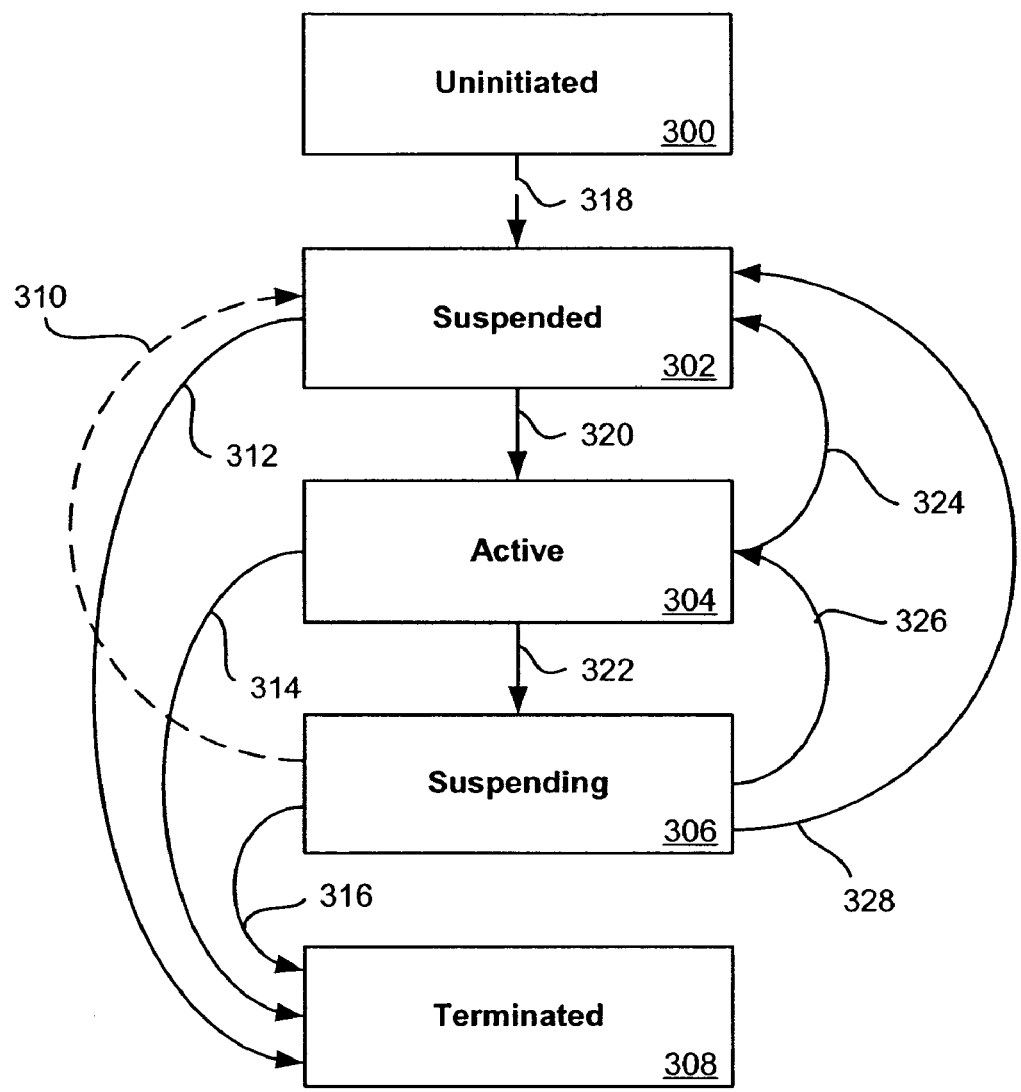
FIG. 3 is a state diagram for the system of FIG. 1.

A server service interface can be implemented by a service to provide the ability to plug into a server and participate in the server's lifecycle. A server service interface can include methods such as activate( ), hardSuspend( ), initialize( ), shutdown( ), and suspend( ). These methods can move a service between states, as shown in FIG. 3.

An initialize method 318 can initialize a service in an uninitiated state 300, moving it to a suspended state 302. The service can be free to read its configuration and can claim any resource that is not reserved for active servers. The service may not be able to serve client requests, use cluster services, use cluster services, or pass out external references to this server. A service that is attempting to initialize can check licenses, check the configuration for consistency, and initialize in ways that do not require claiming resources reserved for active servers. This can include exporting RMI objects, binding services to JNDI, and claiming external resources that are required for fast activation.

An activate method 320, 326 can activate a service, moving it to an active state 304. At the completion of this method 320, a service can service external requests. This can involve completing initialization once a service can claim resources restricted to active servers. This method can return quickly and can have a low probability of failure.

A suspend method 322 can suspend a service, moving it to a "suspending" state 306. This method can cause the service to begin rejecting new requests that are not associated with in-flight work. A container can generally allow local requests, but may not allow requests from external clients at this point. If an external request is part of a transaction or session that cannot be recovered, however, the request should be allowed. While in the suspended state 306, a suspend completed method 310 can move a service to a suspended state 302.

A hard suspend method 324, 328 can hard-suspend a service, moving it to a suspended state 302. This method can cause the service to reject all new requests and release any resources that are reserved for active servers. A shutdown method 312, 314, 316 can shut down the service, moving it to a terminated state 308. This method can be called immediately before the server process is shutdown. This can be the last opportunity that a service has to release external resources. There may be no work for a service to do at this point.

An uninitialized server that has just been started may not yet have completed initialization. A server can start in this state and immediately begin initialization. A suspended server can be prepared to run, and remotely administrable, but may not yet be capable of servicing clients. The server can be listening on an administration port but may not have begun listening for client requests and may not yet be advertising its services to the cluster.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for manually migrating a service in a server cluster, comprising:
   providing a migratable target list containing a list of servers in a server cluster capable of hosting an active service class instance, wherein the servers in the migratable target list are ordered by preference;
   deactivating an active service class instance located on a host server in the server cluster;
   selecting a new host server in the server cluster to host the active service class instance, the new host server being selected as the next server in the migratable target list containing a list of servers in the server cluster capable of hosting the active service class instance;
   activating the service class instance on the new host server;
   waiting for a response from the new host server indicating that the service class instance is active on the new host server;
   assigning a lease to the new host server hosting the active service class instance, the lease containing the length of time for which the new host server can host the active service class instance; and
   deactivating the active service class instance when the lease expires.

2. A method according to claim 1, further comprising:
   deploying a service class instance on each server in the migratable target list.

3. A method according to claim 1, further comprising:
   activating a service class instance on a host server in the server cluster before any migration.

4. A method according to claim 1, further comprising:
   calling an activate method to activate a service class instance.

5. A method according to claim 1, further comprising:
   renewing the lease on the server hosting the active service class instance.

6. The method of claim 1, wherein a migration-aware service stub is able to find the current host of the active service class instance, transparent to the caller.

7. The method of claim 1, wherein if migration is in progress at the time of a call to a service class instance, the call can be blocked until migration has occurred.

8. The method of claim 7, wherein a migration timeout property can timeout a retry if a request timeout expires before the call to the service class instance succeeds.

9. The method of claim 1, wherein a service class instance can be targeted to at most a single migratable target.

10. The method of claim 1, wherein adding a migratable target to a migratable target list can trigger the activation of a service class instance.

11. The method of claim 1, wherein a cluster can ensure that each service class instance is only active on one server at a time.

12. A computer-readable storage medium, including instructions stored thereon which when read and executed by a computer cause the computer to perform steps comprising:
   means for providing a migratable target list containing a list of servers in a server cluster capable of hosting an active service class instance, wherein the servers in the migratable target list are ordered by preference;
   means for deactivating an active service class instance located on a host server in the server cluster;

means for selecting a new host server in the server cluster to host the active service class instance, the new host server being selected as the next server in the migratable target list containing a list of servers in the server cluster capable of hosting the active service class instance;

means for activating the service class instance on the new host server;

means for waiting for a response from the new host server indicating that the service class instance is active on the new host server;

means for assigning a lease to the new host server hosting the active service class instance, the lease containing the length of time for which the new host server can host the active service class instance; and means for deactivating the active service class instance when the lease expires.

13. A computer readable storage medium for execution by a server computer for migrating a service in a server cluster, comprising:

computer code for providing a migratable target list containing a list of servers in a server cluster capable of hosting an active service class instance, wherein the servers in the migratable target list are ordered by preference;

computer code for deactivating an active service class instance located on a host server in the server cluster;

computer code for selecting a new host server in the server cluster to host the active service class instance, the new host server being selected as the next server in the migratable target list containing a list of servers in the server cluster capable of hosting the active service class instance;

computer code for activating the service class instance on the new host server;

computer code for waiting for a response from the new host server indicating that the service class instance is active on the new host server;

computer code for assigning a lease to the new host server hosting the active service class instance, the lease containing the length of time for which the new host server can host the active service class instance; and computer code for deactivating the active service class instance when the lease expires.

14. A computer-readable storage medium having stored thereon one or more sequences of instructions for migrating a service in a server cluster, wherein execution of the one or more sequences of instructions by one or more processors comprising:

means for providing a migratable target list containing a list of servers in a server cluster capable of hosting an active service class instance, wherein the servers in the migratable target list are ordered by preference;

means for deactivating an active service class instance located on a host server in the server cluster;

means for selecting a new host server in the server cluster to host the active service class instance, the new host server being selected as the next server in the migratable target list containing a list of servers in the server cluster capable of hosting the active service class instance;

means for activating the service class instance on the new host server;

means for waiting for a response from the new host server indicating that the service class instance is active on the new host server;

means for assigning a lease to the new host server hosting the active service class instance, the lease containing the length of time for which the new host server can host the active service class instance; and means for deactivating the active service class instance when the lease expires.

15. A computer system comprising:

a processor;

object code executed by said processor, said object code configured to:

provide a migratable target list containing a list of servers in a server cluster capable of hosting an active service class instance, wherein the servers in the migratable target list are ordered by preference;

deactivate an active service class instance located on a host server in the server cluster;

select a new host server in the server cluster to host the active service class instance, the new host server being selected as the next server in the migratable target list containing a list of servers in the server cluster capable of hosting the active service class instance;

activate the service class instance on the new host server;

wait for a response from the new host server indicating that the service class instance is active on the new host server;

assign a lease to the new host server hosting the active service class instance, the lease containing the length of time for which the new host server can host the active service class instance; and deactivate the active service class instance when the lease expires.

* * * * *

UNITED STATES PATENT AND TRADEMARK OFFICE
CERTIFICATE OF CORRECTION

| | | |
|---|---|---|
| PATENT NO. | : 7,694,003 B2 | Page 1 of 1 |
| APPLICATION NO. | : 11/749669 | |
| DATED | : April 6, 2010 | |
| INVENTOR(S) | : Eric M. Halpern | |

It is certified that error appears in the above-identified patent and that said Letters Patent is hereby corrected as shown below:

Title page, Item (75), in column 1, in "Inventor", line 1, delete "Franciscso," and insert -- Francisco, --, therefor.

In column 5, line 29, delete "migration Timeout" and insert -- migrationTimeout --, therefor.

In column 12, line 7, delete "a" and insert -- an --, therefor.

In column 12, line 35, delete "MigratableTarget" and insert -- MigratableTarget. -- on Col. 12, line 34, after "a" as a continuation of the paragraph.

In column 12, line 49, delete "Ths" and insert -- This --, therefor.

In column 12, line 43, delete "requries" and insert -- requires --, therefor.

In column 14, line 18, after "activated" insert -- . --.

Signed and Sealed this
Nineteenth Day of April, 2011

David J. Kappos
*Director of the United States Patent and Trademark Office*